Nov. 2, 1971   A. J. R. SOARES DE MELO   3,616,609
APPARATUS FOR THE STORAGE AND FEEDING OF WATER TO BOILERS
Filed Dec. 18, 1969   2 Sheets-Sheet 1

INVENTOR
ADELINO JOSE RODRIGUES
SOARES DE MELO

BY Browdy and Neimark
ATTORNEYS

INVENTOR
ADELINO JOSE RODRIGUES
SOARES DE MELO

BY *Browdy and Neimark*

ATTORNEYS

United States Patent Office 3,616,609
Patented Nov. 2, 1971

3,616,609
APPARATUS FOR THE STORAGE AND FEEDING OF WATER TO BOILERS
Adelino Jose Rodrigues Soares de Melo, Lisbon, Portugal, assignor to Termec-Equipamentos Termicos de Coimbra, LDA, Lisbon, Portugal
Filed Dec. 18, 1969, Ser. No. 886,135
Claims priority, application Portugal, Dec. 18, 1968, 50,876
Int. Cl. B01d 19/00
U.S. Cl. 55—164
14 Claims

ABSTRACT OF THE DISCLOSURE

From the description given it results that the present patent application relates to improvements in the assembly of devices for feeding water to boilers bringing about great practical advantages. Among these, the description stresses the possibility of manufacture, assembly and transport of the apparatus as a single block and the facility of automatic regulation of the intake pressure in the manifold of the boiler pumps.

---

The present invention relates to the storage, treatment and supply of water to boiler feed pumps, and, more particularly, to a unit apparatus for strong, treating and feeding water to boilers.

The apparatus is characterized in that it comprises equipment which makes it feasible to mount the apparatus on a rigid and integral frame thus enabling the entire apparatus to be completely manufactured, assembled, tested in a workshop and transported as a blocked or unit to the place of use where, for purposes of starting it off, it is only necessary to make the electrical, water, steam and drain connections to the existing main supplies. The objects of the persent invention and the functions the present apparatus provides include:

(a) Collection of the condensates originated at the steam consuming equipments of the factory plant where the present apparatus is installed.

(b) Storage of these condensates and of raw water fed to the factory in a quantity corresponding to a given period of operation of the boilers at full load.

(c) Degassing—i.e. removal of the gases dissolved in the mixture of raw water with the condensates, namely carbon dioxide and oxygen—by means of a thermal degasser of normal construction.

(d) Chemical treatment of the raw water by means of normally used equipment. Although there is no restriction as to the type and quality of water treatment, it is to be noted that the apparatus is particularly useful for water treatment of the type consisting of decalcification by means of ion exchange with automatic regeneration of the ion exchange substance.

(e) Purification of the feed water with adequate chemical products to provide water on the boilers having the necessary characteristics.

(f) Feeding of the degassed, chemically treated and purified water as above described, to a manifold supplying the boiler pumps at a minimum pressure higher than the minimum inlet pressure admitted by the pumps for them not to suffer damage at the prevailing water temperature. The flow at which the feed water in the above described conditions is supplied to the manifold for feeding the boiler pumps, will range from no-flow to the maximum flow that these pumps can draw when they are all working together. Such a variation is made automatically in accordance with the characteristics of the system and not by means of any special deivces.

(g) Supply of an electric signal to the boiler pumps that stops them as soon as the pressure in the feed manifold is under the minimum inlet pressure that they can stand without getting damaged at the operating temperature of the water.

These and other objects and the nature and advantages of the instant invention will be more apparent from the following detailed description of embodiments of the invention taken in conjunction with the drawing wherein.

Figure 1:
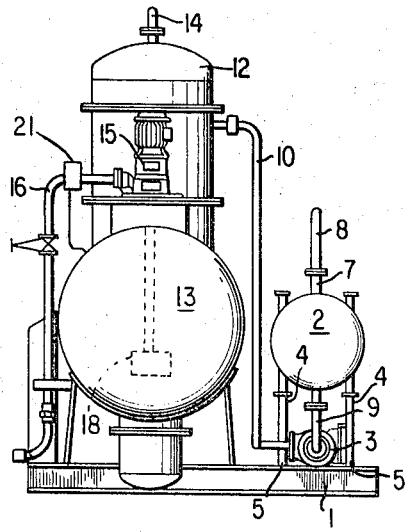
FIGS. 1, 1A and 1B are schematic views of a first embodiment.
Figure 1A:
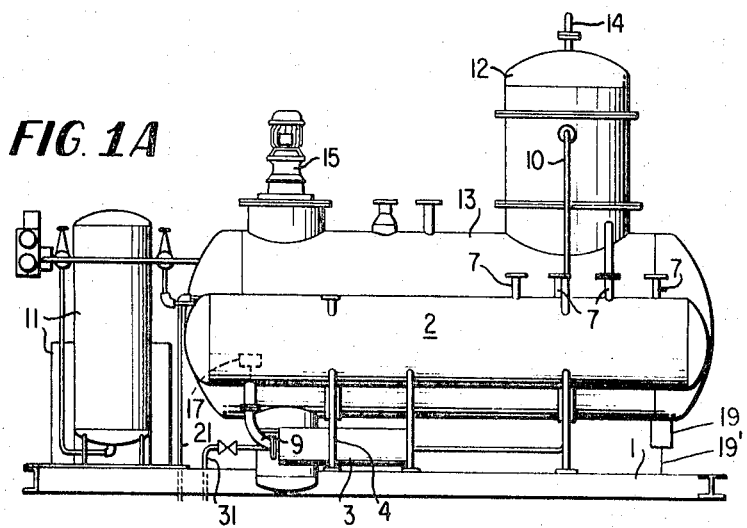
Figure 1B:
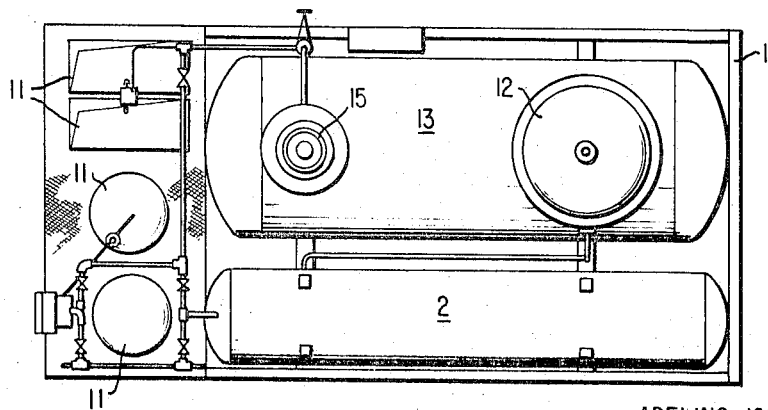

A frame or rigid single block structure is provided on which all the elements that comprise the apparatus are mounted. As mentioned above, such frame 1 allows the apparatus to be completely manufactured in a workship and then shipped complete and ready to operate—after the service connections are made—to the working site. The frame or structure is set directly on the floor of the boiler room, no foundations or fixing points being required, and the apparatus remaining in place due to gravity and the service connections.

Figure 2:
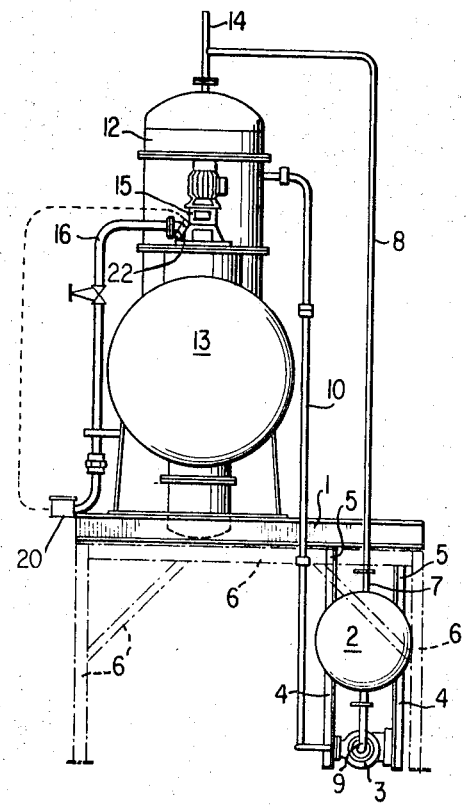
FIGS. 2 and 2A are schematic views of a second embodiment. It will be understood that the attached schematics are submitted for a better understanding of the invention but do not limit in any way the scope thereof.
Figure 2A:
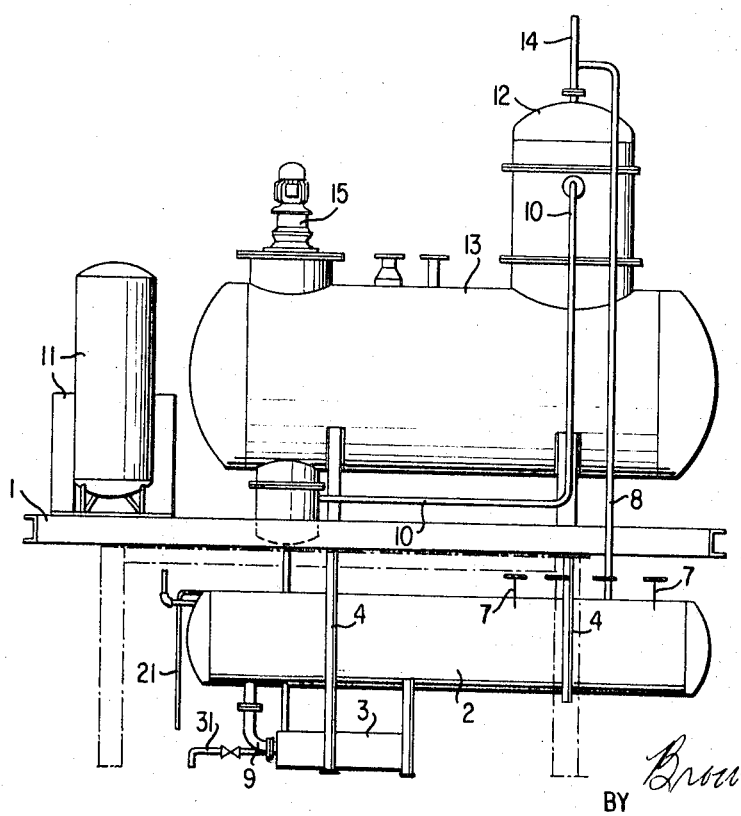

A tank 2 for condensate collections darinage pump 3 for this tank, its accessories and rigid frame 4 and connecting frame 5 constitute a sub-assembly mounted to the frame 1. The provision of this sub-assembly mounted on the rigid frame 1 allows the condensate collective tank to remain in, for example, one of two illustrated positions relatively to the remaining apparatus assembly:

(a) Above the station floor when the condensate collecting tubes arrives at the boiler room at higher than floor level, as schematically indicated in FIG. 1;

(b) Below the station floor when the condensate collecting tubes arrive at the boil room at floor level as represented schematically in FIG. 2. In this case it is necessary to open a small pit in the boiler room to receive the sub-assembly.

This sub-assembly is fixed to the main frame 1 by simply attaching its connecting frame by means of bolts. The sub-assembly is bolted to the lower part for the position above the floor as shown in FIG. 1 and to the upper part for the position belows the floor as shown in FIG. 2. In both cases the sub-assembly is shipped from the workshop already bolted and connected to the main frame 1 in the position require for each case. To facilitate transport when the sub-assembly is placed in the lower position, feet or small structures 6 are mounted on the side opposite to the sub-assembly, to make the base of the apparatus level. These feet or small structures 6 are connected by bolts thus simplifying the dismantling operation when the installation site is reached.

A condensate collecting tank 2 is provided on its upper part with a number of flanged tubings 7 for connection thereof to condensate collecting tubes. The tank 2 is also provided with a ventilating chimney 8 which makes the inside pressure always equal or only a little higher than the atmospheric pressure. This chimney 8 is connected to a degasses chimney 14 described below. Tank 2 is also provided with a pump connection 9 and with two drain connections to the drain: one direct drain 31 and the other through an overflow drain 21.

The drainage pump 3 in the sub-assembly with the function of emptying the condensate and sending it through tubing 10 to the crown of the degasser 12 described below, is preferably of the centrifugal type requiring a low suction height and which is adequate for operating with hot water; other types of pump may, however, be employed according to the circumstances.

At the suction intake of this pump inside of the tank 2, a temperature measuring element 17 is placed to provide a signal for stopping the pump if the water temperature rises above the acceptable value. With certain types of pump a float is also provided to start or stop the pump in accordance with the tank level.

An assembly 11 is provided for physical and chemical treatment of the water identical to the types currently available on the market. This assembly comprises in the most usual cases water filtering and softening systems by ion exchange with automatic regeneration. The assembly 11 is connected on the intake side to the raw water inlet that supplies the boiler room and on the outlet side to the inlet of the crown 12 of a degasser 13. On the outlet side, the tubing is provided with a branch for feeding the water directly from the assembly 11 to the boilers without passing through the degasser 13 should this have to be placed out of service.

A current type of degasser 13 whose crown 12 has connected to it the inlets for cold water from the raw water supply after it has passed through the water treatment systems and the inlet for condensate from the deposit impelled by the drainage pump 3.

The degasser consists essentially of a tank 13 which contains the treated and degassed water required for operating the boilers during a convenient period of time (usually about an hour) and of the degassing equipments as well as the instruments and controls for its proper operation in accordance with current techniques.

A water pumping system 15 is provided for the purpose of withdrawing the water already treated and degassed contained in the degasser tank 13 and of supplying it under pressure to the feed water manifold 16 which is connected to the boiler pumps 20. This pumping system has two main characteristics:

In the first place the pumping system makes use of pumps submerged 18 in the tank or of centrifugal pumps 19 with a very low suction height placed directly under the tank and connected to it by low pressure loss tubing 19' leading to the feedwater manifold 16, thus making it possible for the tank 13 of the degasser to be placed at a very low height above the ground. This small height, between zero and one metre, provides a very substantial advantage over the conventional method which consists in placing the degasser tank at a height of at least two metres above these pumps. This condition was imposed by the fact that the boiler pumps could not have low intake heights due to having a high outlet pressure (higher than the boiler pressure); on the contrary, the pump that is included in the present apparatus provides water at a low pressure admitting therefore much lower intake heights. This fact is stressed by the use of submerged pumps which, for this reason, avoid the tube height between the tank and its inlet and, also due to this same circumstance, do not have pressure losses at the inlet.

The characteristics of the pumping system applied for the first time to degassers, allow:

(a) Great improvements due to reduction of the degasser height—with large economies in the supporting structure and tubing;

(b) The construction of the single block or unit system which was previously impossible due to transport problems in view of the great height required, and (c) A better supervision and operation by the stoker of the boiler room who does not need to climb to the level of the degasser.

In the second place, the system provides for mounting of a calibrated branch 21 of the pump outlet tubing before its connection to the boiler pumps manifold. This branch leads the water impelled by the pump directly to the degasser tank before it passes to be manifold that feeds the boiler pumps. In this manner the pump can operate permanently without danger of overheating since it will aspirate and deliver the water in a closed circuit. The efficiency of the system depends on the characteristics of the pump and on the diameter of the calibrated openings; by a proper arrangement of these the system is enabled to establish a certain constant pressure within the intake manifold for the boiler pumps when these are not operating and, therefore, when there is no flow within the manifold. When the boiler pumps are operating thus causing a flow within the manifold, the pressure in the manifold will fall to a value determined by the characteristic curves of the boiler pumps and of the apparatus. A study of these curves will determine for each case the pump of the apparatus that it will be necessary to use for the pressure within the manifold not to drop in any circumstances below the minimum suction height that the boiler pumps admit for the feed water temperature.

The system herein described of using calibrated branch in the pump compression to allow same to operate continuously in closed circuit without faults, introduces a substantial improvement in the operating conditions in relation to the habitual degassers. This improvement:

(a) Allows the installation of pumps without the danger of faulty operation which, in turn, makes it possible to place the degasser at the ground height as described above.

(b) Maintains the intake pressure in the manifold of the boiler pumps permanently above the minimum value at which same can operate.

(c) Avoids the use of complicated and costly instruments subject to failures that the alternative solutions require.

(d) Allows a better supervision by the boiler room stoker.

An electric signalling system 22 is placed in the outlet tubing of the pumping system 15, directly before its connection to the intake manifold to the boiler pumps 20, and which is formed by a pressurestat that provides a signal when, due to any fault in the operation of the apparatus, the pressure in said manifold drops below the minimum suction height admitted for the boiler pumps. This signalling system should be connected by the boiler users to the control of the boiler pumps so as to provide immediate stoppage of the pumps when the pressure in the manifold is below minimum. The electric control switchboard of the boilers will operate the safety system of these when the pumps stop.

This system is obviously intended to prevent the boiler pumps from important damage due to cavitation in the event of the pressure in the intake manifold (fault in the apparatus pump, ruptures, leaks, obstructions etc.) falling below the minimum admissible suction height.

Electric (or pneumatic or hydraulic) control panel containing all the controls, relays, interlocks, etc., considered necessary for the proper operation of the apparatus should also be provided, and this will be within the normal skill of the art.

From the description given it results that the present patent application relates to improvements in the assembly of devices for feeding water to boilers bringing about great practical advantages. Among these, the description stresses the possibility of manufacture, assembly and transport of the apparatus as a single block and the facility of automatic regulation of the intake pressure in the manifold of the boiler pumps. It will be understood that the embodiments described may be varied without departing from the invention.

It is claimed:

1. In an apparatus for storage and feeding of water to boilers comprising means to collect condensate from the steam user equipment of the factory plant, storage means for said condensates and raw water from raw water supply means, means to remove gases dissolved in the mixture of raw water and condensate water, chemical treatment means for raw water, means to purify the feed water with chemical products appropriate to the requirements of the boilers, and pumps for feeding water to boilers, the improvements comprising a manifold for receiving said chemically treated and purified water for supply of the boiler pumps at a higher pressure than that which the pumps are capable of pumping at the working temperature of the water, said pumps supply the flow of feed water ranging from zero to the maximum that they can aspirate when all are working together, this flow variation being made automatically in accordance with the characteristics of the system, said means to remove gas to be placed at a very low height above the ground due to its physical relationship to said pumps, and wherein said apparatus is mounted as a unitary block.

2. Single block apparatus for storage and feeding of water to boilers, according to claim 1 characterized in that an electrical signalling system provides an electrical signal to the boiler pumps that stops them as soon as the pressure in the supply manifold is under the minimum intake pressure that they admit at the working temperature of the water.

3. Single block apparatus for storage and feeding of water to boilers, according to claim 1, comprising a tank for collection of condensate, drain pump for this tank and its accessories, characterized in that this sub-assembly of organs is mounted on an appropriate rigid frame that allows the tank for condensate collection to remain mounted on the apparatus assembly above the room floor when the condensate collecting tubes arrive at the boiler room at levels above those of the floor.

4. Single block apparatus for storage and feeding of water to boilers according to claim 1, comprising a tank for collection of condensates, drain pumps for this tank and its accessories, characterized in that this sub-assembly of organs is mounted on an appropriate rigid frame that allows the tank for condensate collection to remain mounted on the apparatus assembly below the room floor when the condensate collecting tubes arrive at the boiler room at floor level.

5. Single block apparatus for storage and feeding of water to boilers, according to claim 4, characterized in that feed or equivalent structures are mounted on the side opposite to the sub-assembly to make the base of the apparatus level during transportation.

6. Single block apparatus for storage and supply of water to boilers, according to claim 4, characterized in that, next to the intake of the said pump inside the tank, a temperature measuring element is provided that emits a signal that stops the pump if the water temperature rises above an acceptable value.

7. Single block apparatus for storage and feeding of water to boilers, according to claim 4, characterized in that it is provided with a float in the tank to start or stop the said pump in accordance with the water level in the tank.

8. Single block apparatus for storage and feeding of water to boilers according to claim 1, characterized in that the condensate collection tank comprises flanged tubing required for connection of the condensate collecting tubes, a ventilating chimney connected to the chimney of the said degasser, connection to said pump and two connections to the drain, one direct and the other by overflow.

9. Single block apparatus for storage and feeding of water to boilers, according to claim 1, comprising a system for pumping the water to withdraw the water already treated and degassed contained in the tank of the degasser and for sending it under pressure to a water manifold for supply of the boilers, characterized in that this system employs pumps submerged in the tank.

10. Single block apparatus for storage and feeding of water to boilers, according to claim 1, comprising a system for pumping the water to withdraw the water already treated and degassed contained in the tank of the degasser and for sending it under pressure to a water manifold for supply of the boilers, characterized in that this system employs centrifugal pumps with a low intake height and placed directly below the tank and connected to it by a tubing with low pressure losses.

11. Single block apparatus for storage and feeding of water to boilers according to claim 10, characterized in that the pumps allow the degasser tank to be placed at a very low height above the ground.

12. Single block apparatus for storage and feeding of water to boilers according to claim 9, characterized in that the said pumps allow the degasser tank to be placed at a very low height above the ground.

13. Single block apparatus for storage and feeding of water to boilers, according to claim 12, characterized in that the apparatus with all the equipments that form it can be fully manufactured, assembled, tested in a workshop and transported as a block to the operating site where it is only necessary to make the electrical, water, steam and drain connections to the existing mains.

14. Single block apparatus for storage and feeding of water to boilers, according to claim 9, characterized in that it is provided with a calibrated branch of the outlet tubing of the pump before this is connected to the manifold of the boiler pumps.

References Cited

UNITED STATES PATENTS

| | | | |
|---|---|---|---|
| 1,806,371 | 5/1931 | Spyer | 55—39 |
| 1,966,796 | 7/1934 | Gerend | 55—54 X |
| 2,774,731 | 12/1956 | Profos | 210—26 |
| 2,842,149 | 7/1958 | Donaldson | 55—39 |
| 3,362,132 | 1/1968 | Schellenberg | 55—21 |

FOREIGN PATENTS 533,148   11/1956   Canada.

REUBEN FRIEDMAN, Primary Examiner

R. W. BURKS, Assistant Examiner